US007730369B2

(12) United States Patent
Cases et al.

(10) Patent No.: US 7,730,369 B2
(45) Date of Patent: Jun. 1, 2010

(54) METHOD FOR PERFORMING MEMORY DIAGNOSTICS USING A PROGRAMMABLE DIAGNOSTIC MEMORY MODULE

(75) Inventors: Moises Cases, Austin, TX (US); Daniel Mark Dreps, Georgetown, TX (US); Bhyrav M. Mutnury, Austin, TX (US); Nam H. Pham, Round Rock, TX (US); Daniel N. De Araujo, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/840,498

(22) Filed: Aug. 17, 2007

(65) Prior Publication Data

US 2009/0049341 A1 Feb. 19, 2009

(51) Int. Cl.
*G11C 29/00* (2006.01)
(52) U.S. Cl. .................................................. 714/718
(58) Field of Classification Search ................ 714/718
See application file for complete search history.

(56) References Cited

U.S. PATENT DOCUMENTS

| 4,354,268 | A | 10/1982 | Michel et al. | |
|---|---|---|---|---|
| 6,467,053 | B1 | 10/2002 | Connolly et al. | |
| 6,832,141 | B2 | 12/2004 | Skeen et al. | |
| 7,184,915 | B2* | 2/2007 | Hansquine et al. | 702/118 |
| 7,206,979 | B1* | 4/2007 | Zarrineh et al. | 714/718 |
| 7,231,562 | B2* | 6/2007 | Ohlhoff et al. | 714/718 |
| 7,246,278 | B2* | 7/2007 | Stocken et al. | 714/718 |
| 7,250,784 | B2* | 7/2007 | Azimi et al. | 324/763 |
| 7,353,328 | B2 | 4/2008 | MacLaren et al. | |
| 7,356,737 | B2 | 4/2008 | Cowell et al. | |
| 7,392,442 | B2* | 6/2008 | Averbuj et al. | 714/718 |
| 7,395,476 | B2* | 7/2008 | Cowell et al. | 714/734 |
| 7,415,649 | B2* | 8/2008 | Bucksch | 714/739 |
| 7,480,830 | B2 | 1/2009 | Cowell et al. | |
| 7,487,413 | B2* | 2/2009 | Lee et al. | 714/718 |
| 7,516,363 | B2 | 4/2009 | Jeddeloh | |
| 2004/0243731 | A1 | 12/2004 | Vu | |

(Continued)

OTHER PUBLICATIONS

Data Sheet for Netlist DLS2 DRAM Load Simulator for DDR2 SDRAMS, Nelist, Inc. Irvine, CA.

*Primary Examiner*—James C Kerveros
(74) *Attorney, Agent, or Firm*—Mitch Harris, Atty at Law, LLC; Andrew M. Harris; Diana R. Gerhardt

(57) ABSTRACT

A method for performing memory diagnostics using a programmable diagnostic memory module provides enhanced testability of memory controller and memory subsystem design. The programmable diagnostic memory module includes an interface for communicating with an external diagnostic system, and the interface is used to transfer commands to the memory module to alter various behaviors of the memory module. The altered behaviors may be changing data streams that are written to the memory module to simulate errors, altering the timing and/or loading of the memory module signals, downloading programs for execution by a processor core within the memory module, changing driver strengths of output signals of the memory module, and manipulating in an analog domain, signals at terminals of the memory module such as injecting noise on power supply connections to the memory module. The memory module may emulate multiple selectable memory module types, and may include a complete storage array to provide standard memory module operation.

20 Claims, 4 Drawing Sheets

U.S. PATENT DOCUMENTS

2005/0096809 A1 5/2005 Skeen et al.
2005/0138506 A1 6/2005 Stocken et al.
2008/0082221 A1 4/2008 Nagy

* cited by examiner

METHOD FOR PERFORMING MEMORY DIAGNOSTICS USING A PROGRAMMABLE DIAGNOSTIC MEMORY MODULE

CROSS-REFERENCE TO RELATED PATENT APPLICATION

The present application is related to U.S. patent application Ser. No. 11/840,481, filed Aug. 17, 2007, entitled "PROGRAMMABLE DIAGNOSTIC MEMORY MODULE", filed concurrently herewith by the same Inventors and assigned to the same Assignee. The above referenced U.S. Patent Application is incorporated herein by reference.

BACKGROUND OF THE INVENTION

1. Technical Field

The present invention relates generally to processing system memory subsystems, and more particularly, to a diagnostic method using a memory module that provides programmable functionality to observe and/or alter memory module behavior.

2. Description of the Related Art

Memory subsystems in present-day computer systems include multiple memory modules that provide system memory. During design and manufacture of such computer systems and their elements such as processor blade units or motherboards, and in particular, dedicated memory controller units and processors incorporating a memory controller unit, it is desirable to evaluate features such as error detection and error correction, as well as design margins for memory performance such as read cycle delay and write cycle timing margins.

However, performance of an actual memory device is typically fixed by design and therefore techniques for testing the error detection/correction mechanisms have traditionally been limited to methods such as using "known bad" modules, or techniques such as forcing parity errors by disabling parity information. Software has long been available for performing system memory tests, but such tests are performed on memory implementations that are fixed by design, or are externally manipulated in a laboratory environment. Timing margins have been evaluated by changing external loads or terminators, but such techniques are time-consuming and provide only a crude evaluation of the actual timing margins. Furthermore, such methodologies do not reveal information describing behavior internal to a memory module, but only the behavior of the memory module when influenced by external loading.

Load devices that can be directly inserted in a standardized memory module socket have provided some simplification of memory controller and system design evaluation, in that test points can be provided while still providing a nominal load equivalent to an actual memory device. However, such test modules typically have fixed signal loading values and replace a memory device with only passive loads and test points, in which the passive loads approximate the loading of an actual memory module. In order to change the loading, the inserted load device would have to be removed and another load device with different loading characteristics would have to be inserted. The test points provided are also not located at the exact location of storage that can be written to and read from, and therefore only provide for measurement of external memory bus signals. Further, testing error detection/correction mechanisms using such a device is still limited to techniques such as externally loading a test point until a fault occurs.

It is therefore desirable to provide a method and apparatus for evaluating memory controller and memory subsystem designs that provide flexible manipulation of the memory subsystem behavior and information about signal behavior at the actual location of the storage. It would further be desirable to provide information about signal behavior internal to a memory module.

SUMMARY OF THE INVENTION

The objective of providing flexible manipulation of memory subsystem behavior and information about signal behavior at the actual location of the storage, including signal behavior internal to the memory module, is provided in a diagnostic memory module and test method.

The diagnostic memory module includes memory module interface terminals for connecting the diagnostic memory module to a memory subsystem in place of an ordinary memory module and an interface for communicating between the diagnostic memory module and an external diagnostic system.

The diagnostic memory module may include programmable elements for altering the behavior of the memory module signals, such as output drivers with programmable drive strength, programmable loading circuits for changing an electrical load at the memory module interface terminals. The diagnostic memory module may also include a processor core for executing program instructions to perform diagnostic operations and the program instructions may be downloaded to the processor core from the external diagnostic system. Alternatively, dedicated logic can be provided to perform diagnostic operations in response to commands received from the interface.

The processor core or dedicated logic may perform operations such as altering data streams written to the diagnostic memory module to simulate errors, alter the timing between address and data signals, and manipulating signals on terminals of the diagnostic memory module, for example power supply connections, in an analog domain, to inject noise. The diagnostic memory module may also include test points for providing access to signals of the diagnostic memory module by external test equipment.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a test method using a diagnostic memory module for performing test and evaluation of memory sub-system designs. The memory module is packaged for insertion into a standard connector that accepts ordinary memory modules, according to the physical design of the system and the memory module types accepted by the system. In the illustrative embodiment, a dual inline memory module (DIMM) package is assumed in accordance with present-day popular packaging styles. However, it is understood that the diagnostic memory module of the present invention can be implemented in any style of packaging and for any memory device architecture. The diagnostic memory module of the present invention includes a programmable element, such as a processor core, for performing various operations within diagnostic memory module, such as varying the loading and timing relationships of the memory module interface signals, as well as altering the supposed contents of the memory module to affect errors. The diagnostic memory module may or may not contain a full storage array for implementing ordinary memory module functionality, and therefore the contents may be "supposed", as opposed to actually stored in an actual storage array. Instead, the contents of a write transfer may be stored in a buffer, altered and then returned in response to a write operation and therefore, the diagnostic memory module may or may not provide actual storage expected by software other than a test program for use with the diagnostic memory module.

The diagnostic memory module of the present invention may be type-programmable, so that a single implementation of an integrated circuit embodying the memory module may be selectably adapted to emulate, for example DDR and DDR2 DRAM modules, with the appropriate changes to the physical interconnect scheme. The selection may be made under program control, by downloading a diagnostic memory module program into a program storage within the memory module, or may be made by a hardwired selection mechanisms such as jumpers or switches. The memory module may be programmable via the download mechanism described above, or the diagnostic program may be permanently stored or stored in a non-volatile memory supporting re-programmability. The programmable element and diagnostic program may be a processor core and associated program instructions, a dedicated logic, or a programmable logic array and associated programming code.

Figure 1:
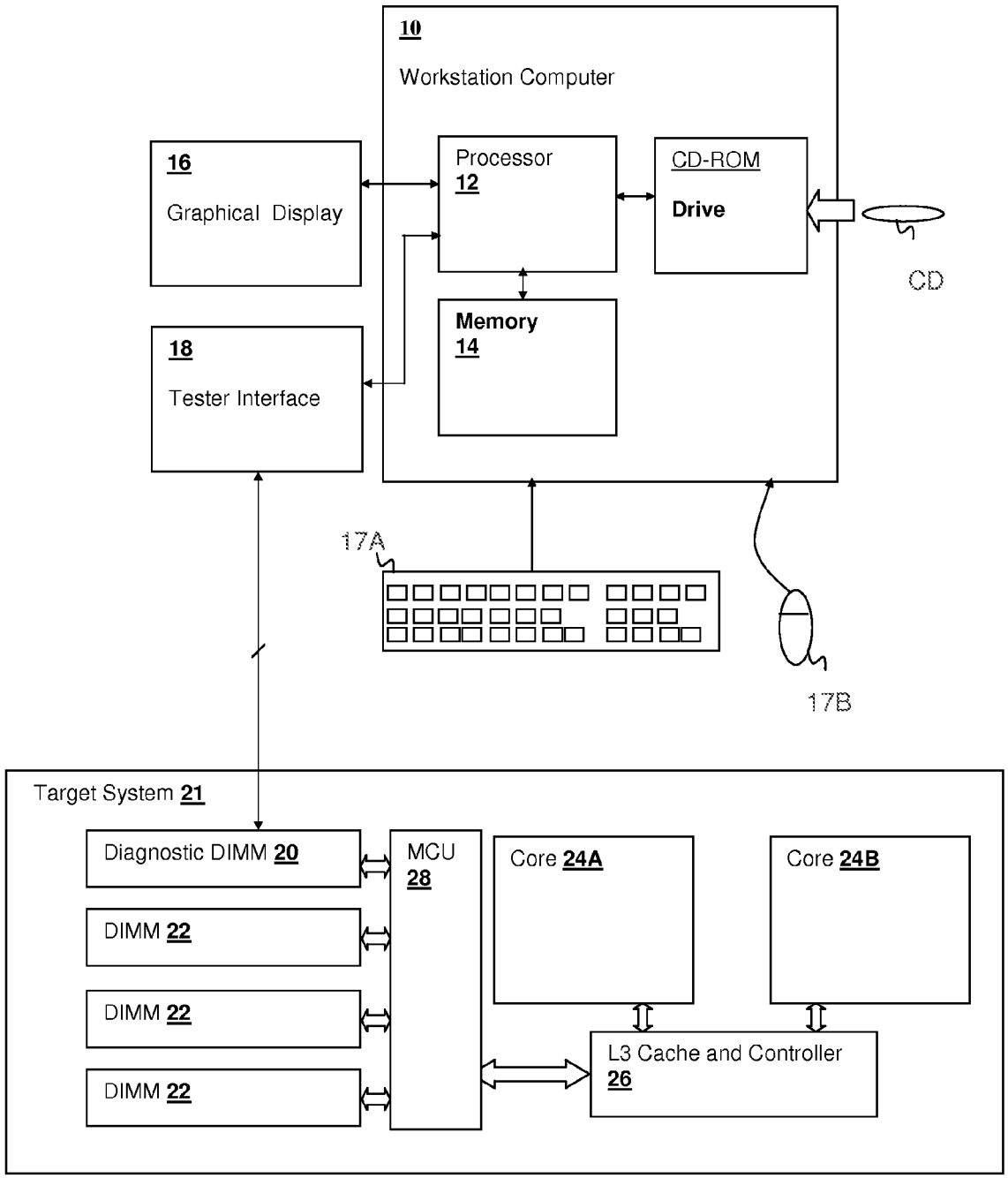
FIG. 1 is a block diagram of a computer system having a diagnostic memory module in accordance with an embodiment of the invention installed, coupled to a workstation test system.

Referring now to FIG. 1, a system in which the present invention can be practiced is illustrated. A workstation computer 10 may be a personal computer, general-purpose workstation, or dedicated test computer system. Workstation computer system 10 includes a graphical display 16 for providing visual information to a user and may be used to monitor operational values received from embodiments of the present invention, as well as controlling settings and downloading program code that perform the methods of the present invention, by communication with a diagnostic memory module 20 within a target computer system 21. A keyboard 17A and a pointing device 17B are attached to workstation computer 10 for receiving user input. Workstation computer 10 includes a processor 12 coupled to a memory 14 that contains program instructions for execution by processor 12 including program instructions in accordance with embodiments of the present invention for controlling and receiving information from target computer system 21. Computer program products in accordance with embodiments of the present invention include media such as compact disc CD that stores encoded program instructions that may be read by CD-ROM drive 15 and stored in memory 14 for execution by processor 12.

Target computer system 21 is illustrated in the form of a blade processor unit, as might be employed within a blade server system. Processor cores 24A and 24B are coupled to a level 3 cache unit 26 that is coupled to a memory controller unit (MCU) 28 that controls the transfer of program instructions and data between a memory subsystem and L3 cache unit 26. The memory subsystem includes four DIMM slots for system memory, which in the illustrated embodiment are populated with three ordinary DIMMS 22 and a diagnostic DIMM 20 in accordance with an embodiment of the present invention. A tester interface 18 of workstation computer system 10 is coupled to diagnostic DIMM 20 via an interface such as a Joint Test Action Group (JTAG) interface, dedicated serial interface, scan chain interface, or any other communications link suitable for transferring data and programs/PGA configuration data between diagnostic DIMM 20 and workstation computer system 10. The electrical connections between tester interface 18 may be via probes to the circuit board of diagnostic DIMM 20, via a cable to an additional connector on diagnostic DIMM 20, or via additional protocols added to a communications interface implemented in DIMM 20 via the ordinary DIMM connector as provided for DIMM power management and DIMM configuration information retrieval.

Figure 2:
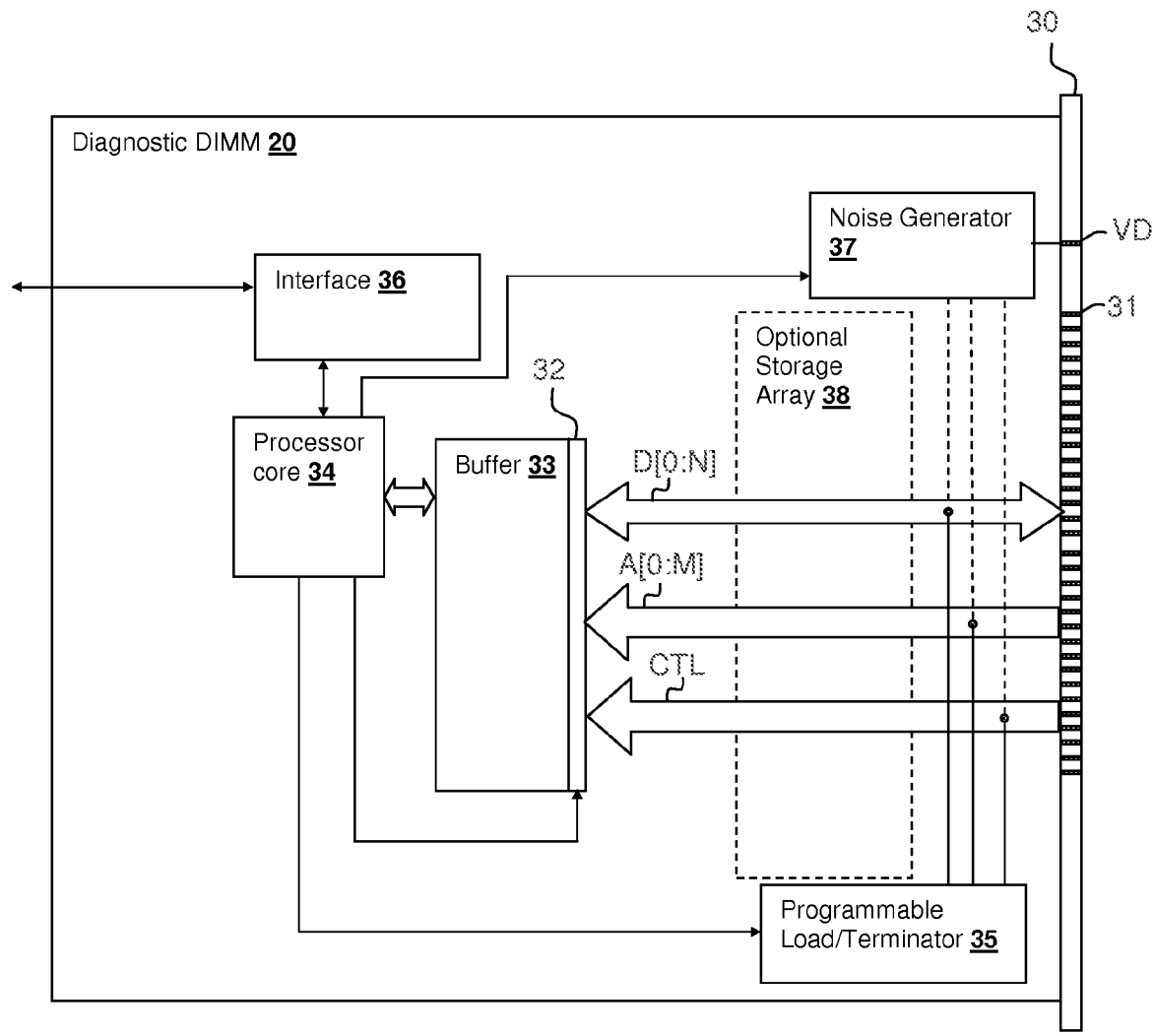
FIG. 2 is a block diagram of a diagnostic memory module in accordance with an embodiment of the invention.

Referring now to FIG. 2, a block diagram of diagnostic DIMM 20 is depicted in accordance with an embodiment of the present invention. An interface 36 provides the above described data and program link between workstation computer system 10 and a processor core 34 (or alternatively dedicated or programmable logic such as a PGA). Diagnostic DIMM 20 includes a connector 30 that connects to target system 20 via edge connector terminals 31 that provide connection for data signals D[0:N], address signals A[0:M] and control signals CTL. An optional storage array 38 provides for operation as an ordinary DIMM, and may be bypassed by processor core 34 for special diagnostic operations as will be described in further detail below. A buffer 33 is provided for simulating data read and data write operations that vary from the performance of operations performed to and from storage array 38. Processor core 34 can modify the contents of buffer 33 to simulate errors, and buffer 33 can also include ECC and/or parity bits so that either error indications or actual error conditions may be set after a write, so that a subsequent read operation yields the error condition. Error conditions such as total lane failure, single and multi-bit line failures and transient bit errors can be easily generated in any pattern. A programmable buffer/delay circuit 32 allows processor core 34 to set characteristics of the interface to and from buffer 33. The read output strength of buffer/delay circuit 32 can be set, along with a delay of address signals A[0:M], control signals CTL and/or data signals D[0:N], so that early/late timing relationships between the address, data and control signals can be explored to evaluate designs and operational systems to locate defects or borderline timing conditions and determine timing margins.

A programmable load/terminator circuit 35, provides for variation of bus loading, timing and voltage characteristics, by programmable adjustment of bus termination/loading characteristics of A[0:M], control signals CTL and/or data signals D[0:N] by processor core 34. A noise generator circuit 37, which may be an analog circuit such as an analog-todigital converter (ADC) coupled via a resistance to one or more of the signals on connector 30, or a digitally-switched circuit that affects signals on connector 30 in the analog domain, provides for simulation of noise effects in the memory subsystem, by injecting noise. For example, noise generator circuits 37 may inject noise on power supply connection VDD of connector 30, and the magnitude/character of the noise is varied to observe effects on performance of either diagnostic DIMM 20 or ordinary DIMMS 22 of FIG. 1.

Figure 3:
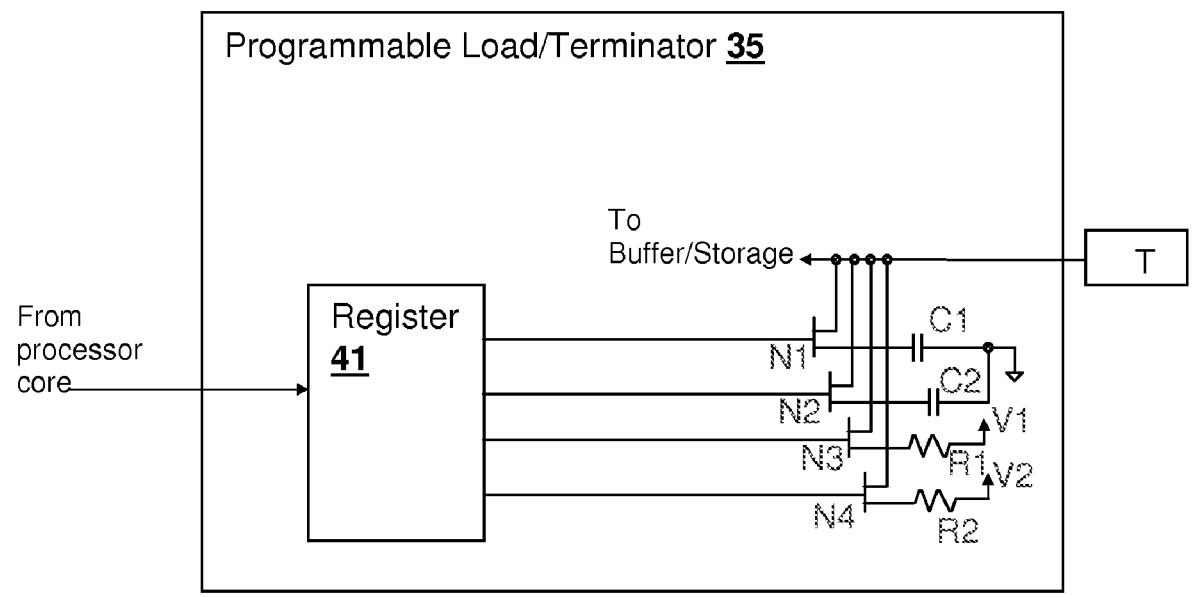
FIG. 3 is a schematic diagram depicting details of programmable load/terminator 35 of FIG. 2, in accordance with an embodiment of the invention.

Referring now to FIG. 3, details of programmable logic/terminator circuit 35 are shown in accordance with an embodiment of the invention. A register 41, receives a value from processor core 34 and controls a set of transistors N1-N4 that selectably couple any combination of termination resistors R1 and R2, which are connected to termination voltage sources V1 and V2, respectively to signals of connector 30 such as terminal T. Loading capacitors C1 and C2 are also selectably coupled to signals of connector 30 to vary the capacitive loading.

Figure 4:
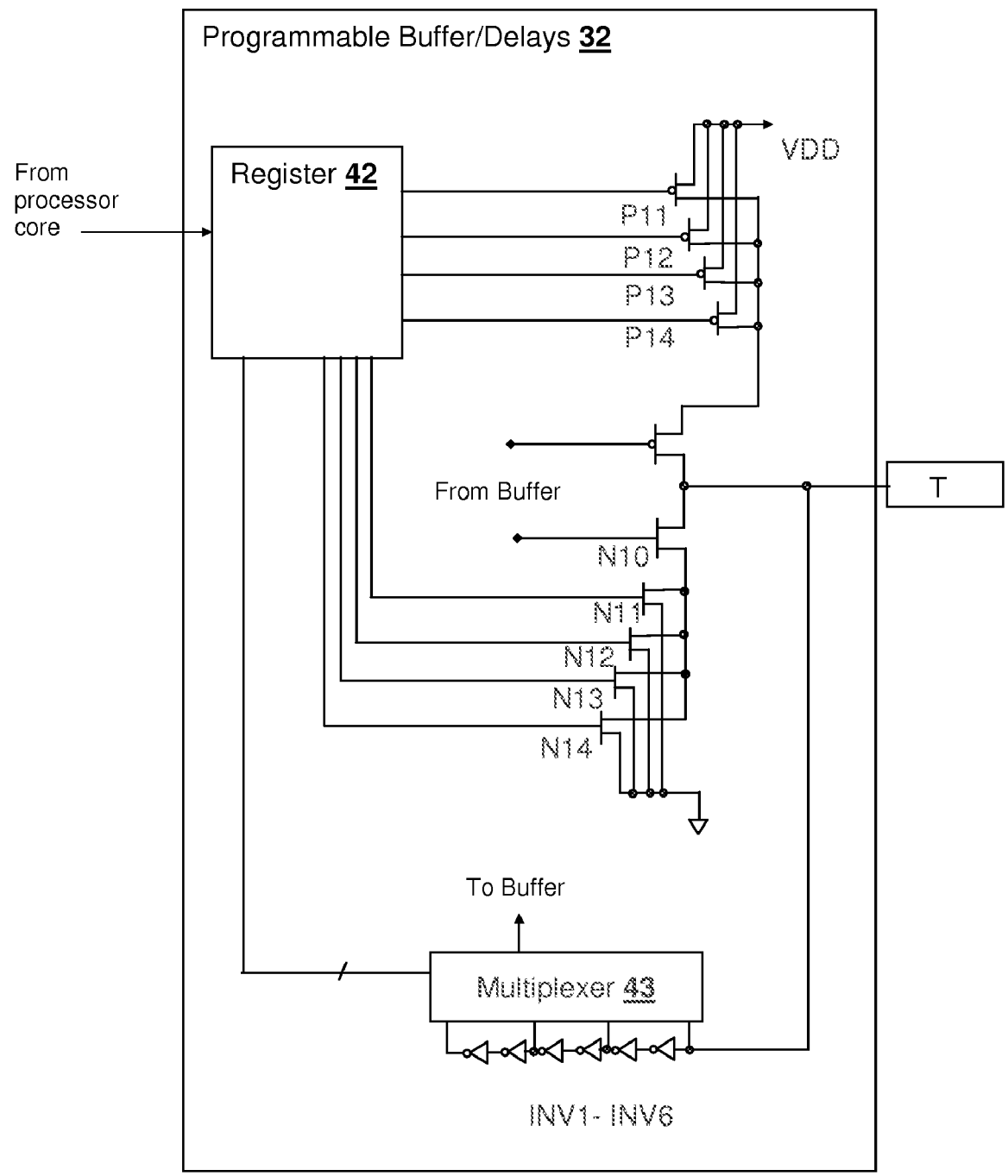
FIG. 4 is schematic diagram depicting details of programmable buffers/delays 32 of FIG. 2, in accordance with an embodiment of the invention.

Referring now to FIG. 4, details of programmable buffers/delay circuit 32 are shown in accordance with an embodiment of the invention. A register 42, receives a value for setting a drive strength of a tri-state inverter implemented by transistors N10 and P10, which is coupled to power supply rail VDD by transistors P11-P14 and to ground by transistor N11-N14. The gates of transistors P11-P14 and transistor N11-N14 are selectably enabled in combinations according to the values set in register 42, to change the source resistance of the tri-state inverter implemented by transistors N10 and P10, which changes the slew rate/delay time provided by the corresponding output signal to terminal T. Programmable buffers/delay circuit 32 also provides a programmable input delay for an input signal received at terminal T by selecting a tap from a delay chain formed by inverters I1-I6 using a multiplexer 43, having a selection controlled by bits provided from register 42.

The above-described embodiment provides, programmable bus line loading, delays and data manipulation that can simulate a wide range of operating and error conditions. Various programs may be downloaded to processor core 34 and used to execute test patterns that can verify and diagnose errors in memory subsystem designs. The above-described embodiment also provides the ability to generate noise on power supplies and/or bus lines to aggravate operating conditions to test the robustness of memory subsystem designs.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for testing a memory subsystem, comprising:
    inserting a detachable diagnostic memory module into a connector of the memory subsystem, wherein the connector is a connector for receiving an ordinary memory module by detachably and electrically coupling the diagnostic memory module to the memory subsystem by memory module interface terminals of the connector;
    communicating with the detachable diagnostic memory module to transfer diagnostic information between the detachable diagnostic memory module and an external diagnostic system wherein the diagnostic information includes a command received by the diagnostic memory module that alters an electrical behavior of the diagnostic memory module; and
    testing the memory subsystem by altering the electrical behavior of the detachable diagnostic memory module in response to the command.

2. The method of claim 1, further comprising providing a storage away within the detachable diagnostic memory module, whereby the storage array is accessible via the connector to provide a storage function within the memory subsystem.

3. The method of claim 1, wherein the communicating transfers program instructions of a diagnostic program from the external diagnostic system to the detachable diagnostic memory module, and further comprising executing the diagnostic program within the detachable diagnostic memory module.

4. The method of claim 3, wherein the executing the diagnostic program comprises:
    storing a stream of data corresponding to memory write operation operations received at the memory module interface terminals of the detachable diagnostic memory module;
    altering the stream of data to generate an altered stream for simulating an error condition; and
    responding to memory read operations received at the memory module interface terminals by providing the altered stream at the memory module interface terminals.

5. The method of claim 1, wherein the communicating transfers the command to cause the detachable diagnostic memory module to alter a loading at the memory module interface terminals.

6. The method of claim 1, wherein the communicating communicates the command to cause the detachable diagnostic memory module to manipulate a signal on at least one of the memory module interface terminals in an analog domain to simulate noise, and wherein the detachable diagnostic memory module manipulates the signal in response to receiving the command.

7. The method of claim 6, wherein the at least one memory module interface terminal is a power supply terminal of the memory subsystem.

8. The method of claim 1, wherein the communicating transfers the command to cause the diagnostic memory module to alter a drive strength of output signals provided from the detachable diagnostic memory module at the memory module interface terminals.

9. The method of claim 1, wherein the communicating transfers the command to alter a timing relationship between address signals and data signals within the detachable diagnostic memory module.

10. The method of claim 1, wherein the communicating communicates the command to the detachable diagnostic memory module to cause the detachable diagnostic memory module to emulate a particular module type of a plurality of memory module types, and wherein the method further comprises emulating the particular module type in response to receiving the command.

11. A method for testing a memory subsystem, comprising:
    inserting a detachable diagnostic memory module into a connector of the memory subsystem, wherein the connector is a connector for receiving an ordinary memory module, wherein the connector detachably and electrically couples the diagnostic memory module to the memory subsystem by memory module interface terminals of the connector;
    communicating with the detachable diagnostic memory module to transfer diagnostic information between the detachable diagnostic memory module and an external diagnostic system, wherein said diagnostic information includes program instructions of a diagnostic program transferred from the external diagnostic system to the detachable diagnostic memory module wherein the diagnostic information includes a command received by the diagnostic memory module that alters an electrical behavior of the diagnostic memory module; and executing the diagnostic program within the detachable diagnostic memory module to store a stream of data corresponding to memory write operations received at the memory module interface terminals of the detachable diagnostic memory module, alter the stream of data to generate an altered stream for simulating an error condition, and respond to memory read operations received at the memory module interface terminals by providing the altered stream at the memory module interface terminals.

12. The method of claim 11, wherein the communicating transfers a command to alter a loading of the detachable diagnostic memory module at the memory module interface terminals.

13. The method of claim 11, wherein the communicating communicates a command to the detachable diagnostic memory module to manipulate a signal on at least one of the memory interface terminals in an analog domain to simulate noise, and wherein the detachable diagnostic memory module manipulates the signal in response to receiving the command.

14. The method of claim 13, wherein the at least one memory module interface terminal is a power supply terminal of the memory subsystem.

15. The method of claim 13, wherein the detachable diagnostic memory module manipulates the signal by providing values to an analog-to-digital converter to generate a simulated noise waveform.

16. The method of claim 11, wherein the communicating transfers a command to alter a drive strength of output signals provided from the detachable diagnostic memory module at the memory module interface terminals.

17. The method of claim 11, wherein the communicating transfers a command to alter a timing relationship between address signals and data signals within the detachable diagnostic memory module.

18. The method of claim 11, wherein the communicating communicates a command to the detachable diagnostic memory module to emulate a particular module type of a plurality of memory module types, and wherein the method further comprises emulating the particular module type in response to receiving the command.

19. The method of claim 18, wherein the command specifies emulation of one of at least a set of types including DDR and DDR2 memory types.

20. A method for testing a memory subsystem, comprising:
inserting a detachable diagnostic memory module into a connector of the memory subsystem, wherein the connector is a connector for receiving an ordinary memory module, wherein the connector detachably and electrically couples the diagnostic memory module to the memory subsystem by memory module interface terminals of the connector;

communicating with the detachable diagnostic memory module to transfer diagnostic information between the detachable diagnostic memory module and an external diagnostic system, wherein said diagnostic information includes program instructions of a diagnostic program transferred from the external diagnostic system to the detachable diagnostic memory module;

executing the diagnostic program within the detachable diagnostic memory module to store a stream of data corresponding to memory write operations received at the memory module interface terminals of the detachable diagnostic memory module, alter the stream of data to generate an altered stream for simulating an error condition, and respond to memory read operations received at the memory module interface terminals by providing the altered stream at the memory module interface terminals;

sending a first command from the external diagnostic system to the detachable diagnostic memory module to alter a loading of the detachable diagnostic memory module at the memory module interface terminals;

sending a second command from the external diagnostic system to the detachable diagnostic memory module to manipulate a signal on at least one of the memory module interfaces terminals in an analog domain to simulate noise, and wherein the detachable diagnostic memory module manipulates the signal in response to receiving the command;

sending a third command from the external diagnostic system to the detachable diagnostic memory module to alter a drive strength of output signals provided from the detachable diagnostic memory module at the memory module interface terminals; and sending a fourth command from the external diagnostic system to the detachable diagnostic memory module to alter a timing relationship between address signals and data signals within the detachable diagnostic memory module.

* * * * *